US012589614B2

(12) United States Patent　　　　(10) Patent No.:　US 12,589,614 B2
Sokolowski et al.　　　　　　　　　　(45) Date of Patent:　Mar. 31, 2026

(54) HEAT SHIELD PANEL

(71) Applicant: Goodrich Corporation, Charlotte, NC (US)

(72) Inventors: Marcin Szymon Sokolowski, Wojsławice-Kolonia (PL); Bartłomiej Kamil Żuk, Legnica (PL); Karol Straś, Jelenia Góra (PL); Jacek Olejak, Bestwinka (PL)

(73) Assignee: GOODRICH CORPORATION, Charlotte, NC (US)

( * ) Notice: Subject to any disclaimer, the term of this patent is extended or adjusted under 35 U.S.C. 154(b) by 350 days.

(21) Appl. No.: 18/354,441

(22) Filed: Jul. 18, 2023

(65)　　　Prior Publication Data

US 2024/0051336 A1　　Feb. 15, 2024

(30)　　Foreign Application Priority Data

Aug. 12, 2022　　(EP) ..................................... 22461594

(51) Int. Cl.
　*B60B 21/12*　　　　(2006.01)
　*B64C 25/36*　　　　(2006.01)
(52) U.S. Cl.
　CPC .............. *B60B 21/12* (2013.01); *B64C 25/36* (2013.01); *B60B 2310/302* (2013.01); *B60B 2900/211* (2013.01); *B60B 2900/513* (2013.01)
(58) Field of Classification Search
　CPC .............. B60B 21/12; B60B 2310/302; B60B 2900/211; B60B 2900/513; B64C 25/36; B64C 25/42; F16D 65/47; F16D 2065/784
　USPC ................................................... 301/95.101
　See application file for complete search history.

(56)　　　　References Cited

U.S. PATENT DOCUMENTS

| | | | | | |
|---|---|---|---|---|---|
| 3,281,001 | A | * | 10/1966 | Stuart ..................... | B65D 41/42 |
| | | | | | 215/254 |
| 4,017,123 | A | * | 4/1977 | Horner ..................... | F16D 65/12 |
| | | | | | 188/264 G |
| 5,002,342 | A | * | 3/1991 | Dyko ...................... | B60C 23/18 |
| | | | | | 188/264 G |
| 5,851,056 | A | * | 12/1998 | Hyde ...................... | B60B 19/10 |
| | | | | | 188/264 G |
| 9,908,375 | B2 | * | 3/2018 | Baden ................... | F16D 65/847 |
| 10,330,163 | B2 | * | 6/2019 | French ................... | B64C 25/42 |

(Continued)

FOREIGN PATENT DOCUMENTS

| | | | | | |
|---|---|---|---|---|---|
| AU | | 611386 B2 | * | 6/1991 | ............. F01N 13/14 |
| EP | | 3922481 B1 | * | 11/2023 | ............. B60B 21/12 |

OTHER PUBLICATIONS

EPO, Extended European Search Report dated Feb. 20, 2023 in EP Serial No. 22461594.8.

*Primary Examiner* — S. Joseph Morano
*Assistant Examiner* — Eva L Comino
(74) *Attorney, Agent, or Firm* — SNELL & WILMER L.L.P.

(57)　　　　ABSTRACT

A heat shield panel comprising an inner heat shield layer and an outer heat shield layer, the inner heat shield layer and the outer heat shield layer each having two outer edges wherein the outer edges of the inner heat shield layer and the outer edges of the inner heat shield layer are substantially aligned and are affixed to each other to form heat shield panel edges, and wherein the inner heat shield layer is formed of two or more segments each having an inner edge, the inner edges of the segments being arranged to move relative to each other.

13 Claims, 4 Drawing Sheets

(56)                References Cited

U.S. PATENT DOCUMENTS

| | | | |
|---|---|---|---|
| 10,967,961 B2 * | 4/2021 | Leiva ..................... | F16D 55/36 |
| 2020/0130818 A1 * | 4/2020 | Leiva ................. | B60B 27/0052 |
| 2020/0189727 A1 * | 6/2020 | French ............... | F16D 65/0081 |

* cited by examiner

HEAT SHIELD PANEL

CROSS-REFERENCE TO RELATED APPLICATIONS

This application claims priority to, and the benefit of, EP Patent Application No. 22461594.8, filed Aug. 12, 2022 (DAS Code 546C) and titled "HEAT SHIELD PANEL," which is incorporated by reference herein in its entirety for all purposes.

FIELD

The present disclosure relates to a heat shield panel for a heat shield assembly for a wheel for a vehicle especially, but not exclusively, for an aircraft wheel.

BACKGROUND

Wheels on aircraft and other vehicles are often provided with a brake assembly comprising a stack of brake discs mounted inside the wheel, within the tube well of the wheel. The brake operates by compressing the brake discs together to slow and stop rotation of the wheel. The friction between the pressed brake discs generates a large amount of heat which can cause damage to the wheel and/or tires. It is conventional to provide a heat shield between the brake assembly and the wheel rim or tube well to reduce the effects of the heat generated by braking on the wheel parts. The heat shield can also catch hot brake material that is ejected from the brake discs during braking, before it strikes the wheel.

Various types of heat shield are known but, typically, heat shields are in the form of metal sheets or panels provided concentric with the wheel tube well and spaced a small distance from the tube well. Typically, the heat shield is formed from several layers of sheet metal including an inner layer and outer layers (wherein 'inner' means closer to the brake parts, and the radial direction is defined when the heat shield is mounted in the wheel, the wheel axis defining the axial direction). The heat shield can be provided as a single cylindrical unit (of such inner and outer layers) but more typically is formed as a number of arcuate panels or segments of layers that are attached together via connectors at seams between the panels, to form a complete cylindrical heat shield.

Particularly with the increased use of carbon disc brakes, which have greater energy absorption capability than steel brakes and are significantly lighter, but which are larger than steel brake discs, it is important for the heat shields to be robust. There is, however, also a need for them to be as simple and lightweight as possible. In aircraft in particular, but also in other vehicles with braked wheels, there is a need to minimize the weight and size of the wheel assembly. Heat shields are therefore, often made of thin metal sheets but may be formed from two or more layers (as mentioned above) with an insulation gap therebetween.

Because of the high temperature and high stress/vibrational environments that braked wheels operate in and high centrifugal forces acting on the heat shields, as well as changes in tire pressure, the heat shield can be caused to deform and/or deflect. This can cause high stresses on the heat shield and can cause the heat shield to come into contact with the wheel tube well which can, in turn, result in wheel abrasion. Where the panels of the heat shield are formed of inner and outer layers of sheet metal, with a radially inner layer and one or more radially outer layers, in use, the inner layer will tend to become hotter than the radially outer layer(s) and will, therefore, undergo a different thermal expansion. The connectors that join the panels at the seams secure the layers forming the panel together at the seams—i.e. the inner and outer layers of each panel are essentially clamped or secured together at the edges of the panel which means that the inner and outer layers of a panel are not able to move relative to each other. Because of this, the difference in thermal expansion between the inner and outer layers leads to the heat shield panel deforming or buckling. The deformed surface, which bows outwards, may abut against the wheel and therefor suffer or cause damage or degradation.

There is a need for a heat shield assembly which is less prone to deflection and deforming, so as to avoid or reduce damage to the heat shield and to avoid or reduce wheel abrasion.

SUMMARY

According to the present disclosure, there is provided a heat shield panel comprising an inner heat shield layer and an outer heat shield layer, the inner heat shield layer and the outer heat shield layer each having two outer edges wherein the outer edges of the inner heat shield layer and the outer edges of the inner heat shield layer are substantially aligned and are affixed to each other to form heat shield panel edges, and wherein the inner heat shield layer is formed of two or more segments each having an inner edge, the inner edges of the segments being arranged to move relative to each other

BRIEF DESCRIPTION OF THE DRAWINGS

The assembly according to the disclosure will be described, by way of example only, with reference to the drawings. Variations and modifications are possible within the scope of the claims.

DETAILED DESCRIPTION

Figure 1:
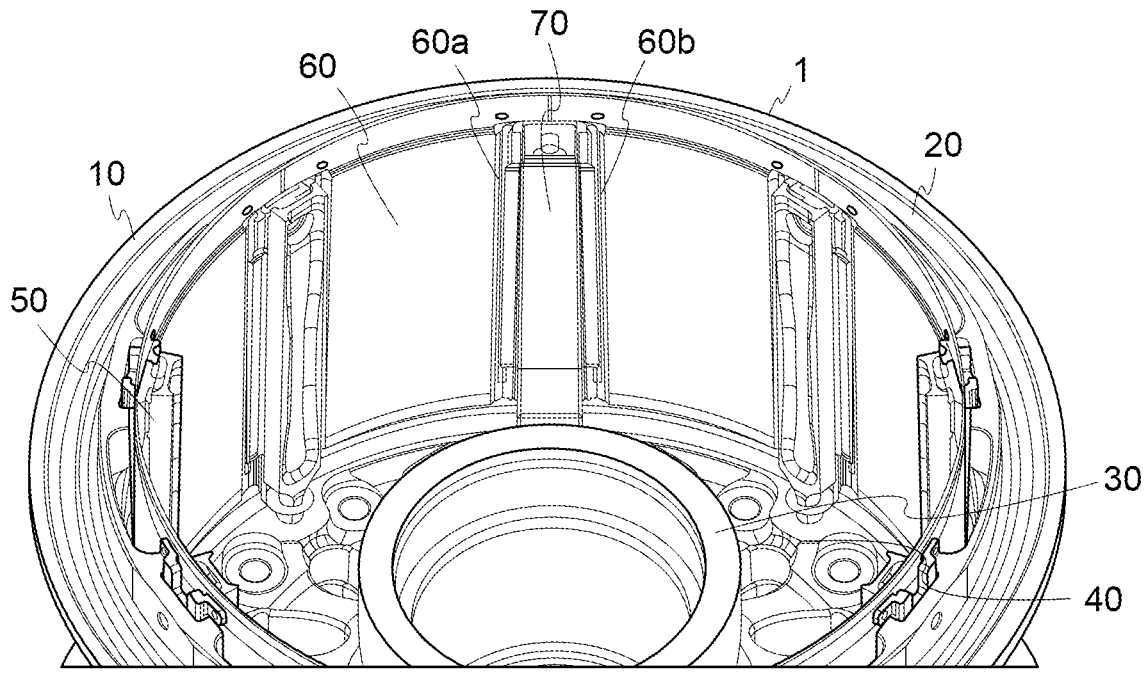
FIG. 1 shows an example of a heat shield in a wheel.
Figure 2:
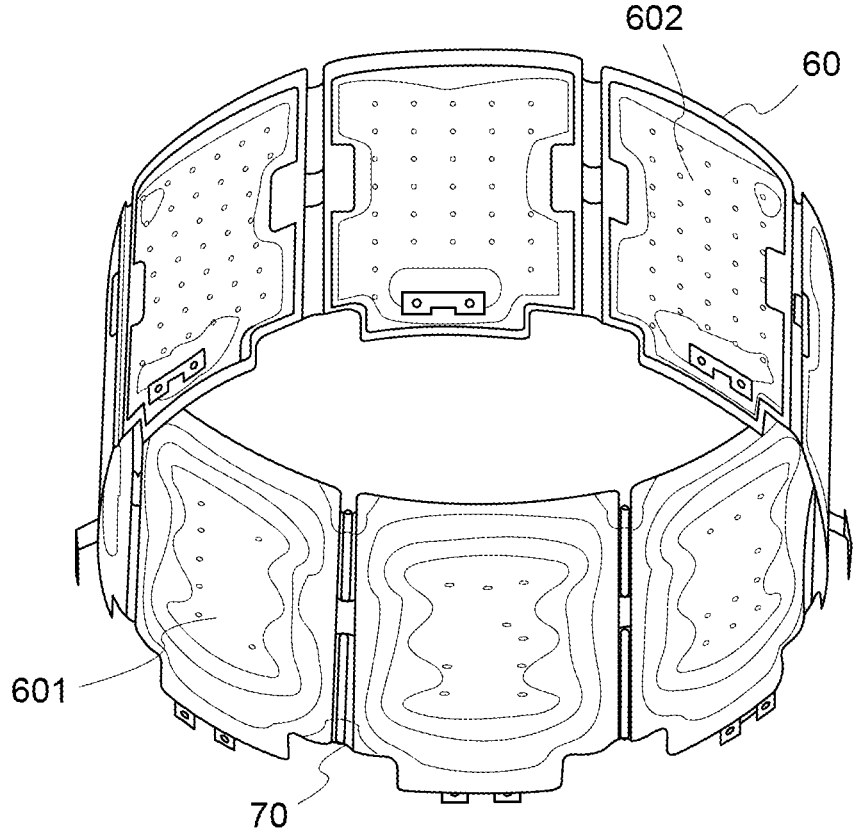
FIG. 2 shows conventional heat shield panels as in FIG. 1.

FIG. 1 shows a section of a typical wheel assembly comprising a wheel rim or tube well 1 having an outer diameter surface 10, on which a tire (not shown) will usually be mounted, and an inner diameter surface 20 defining an interior cavity in which a brake assembly (not shown) will typically be arranged around a wheel hub 30. The hub 30 would be attached by bearing to an axle (not shown). The hub 30 is connected to the wheel rim 1 via a web 40. Rotor disc drive lugs (or torque bars) 50 extend axially across the tube well 1 for engagement with the brake discs.

Figure 4:
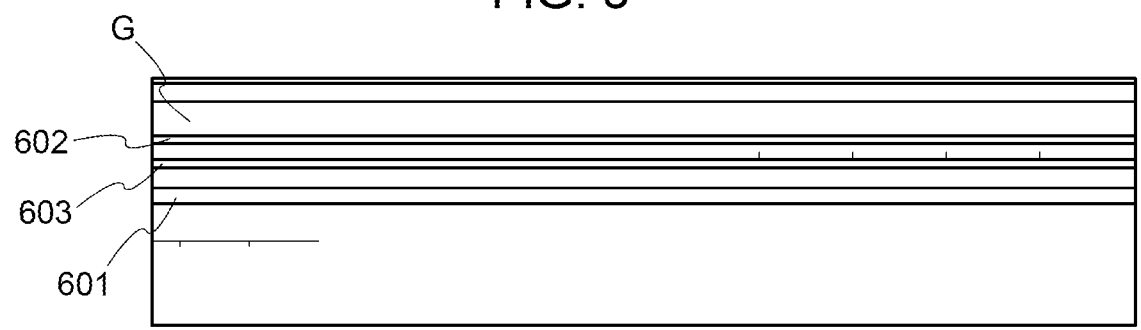
FIG. 4 is a view of a conventional heat shield panel.

To protect the wheel rim 1 from the heat generated during hard braking or from brake disc material ejected during braking, a heat shield is mounted to the inner diameter surface 20 of the wheel. The heat shield may be a single tubular shield or, as shown in this example, may be formed of several heat shield panels 60 provided between the rotor drive lugs 50. The heat shield/panels 60 is in the form of several thin metal sheets or layers sandwiched together, including an inner layer 601 and an outer layer 602, and possible one or more intermediate layers 603, and with insulation gaps G therebetween, as seen in FIG. 4, and is attached to the wheel so as to be spaced apart from the wheel inner diameter surface 20 by a small insulation gap (not shown). Here, the term 'inner layer' is used for the layer of the heat shield panel closest to the tube well and 'outer layer' is the layer of the heat shield panel furthest from the tube well. Where the heat shield is made of a number of panels or segments attached together, the adjoining edges 60a, 60b of the panels are connected by means of connectors 70. The connectors 70 each define a seam between adjacent panels.

Figure 3:
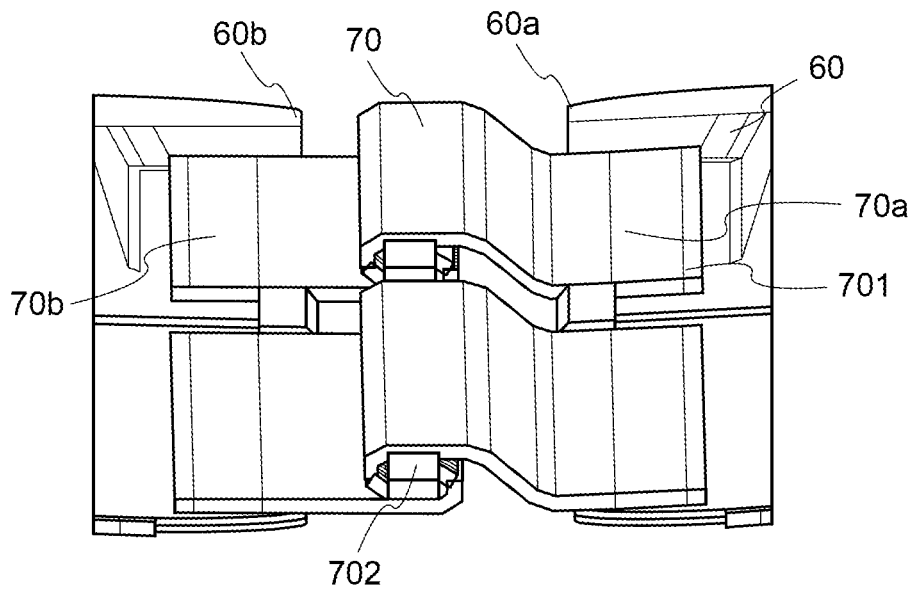
FIG. 3 shows a detailed view of the seam between two adjacent heat shield panels.

A typical connector 70 is shown in FIG. 3. Such a connector 70 is formed to attach to adjacent edges 60a, 60b of adjacent panels to, in use, define the seam between two adjacent heat shield panels. In the example shown, the connector 70 comprises two interlocking hook parts 70a, 70b which are affixed, at one end 701, to the edge of a respective heat shield panel and form a hook shape 702 at the opposite end. To connect the two adjacent panels, the respective hook shapes interlock. The end of the connector parts may be affixed to the respective edge of the in various ways provided a secure attachment to the panel is provided. In the example shown, the connector part is affixed to the panel edge by seam welding, but it may be envisaged that other forms of adhesion or fixation, e.g. using fixation elements, may be used. Instead of the hook shapes, other interlocking shapes or features may be used, provided the connector secures the two adjacent panels, at the seam, to each other. The example in FIG. 3 shows two connectors 70 provided between a pair of adjacent panels 60, but it is also possible for there to be only a single connector or more than two connectors. As mentioned above, each panel 60 is formed of multiple layers 601, 602, 603 (best seen in FIG. 4) and these layers will be secured to each other at the edge of the panel to ensure the entire panel is secured by the connector(s). This means that the connector(s) will be affixed to all of the layers (three layers are shown in the examples, but other numbers of layers are possible) and so the layers of a panel 60 will not be able to move or shift relative to each other.

Figure 5:
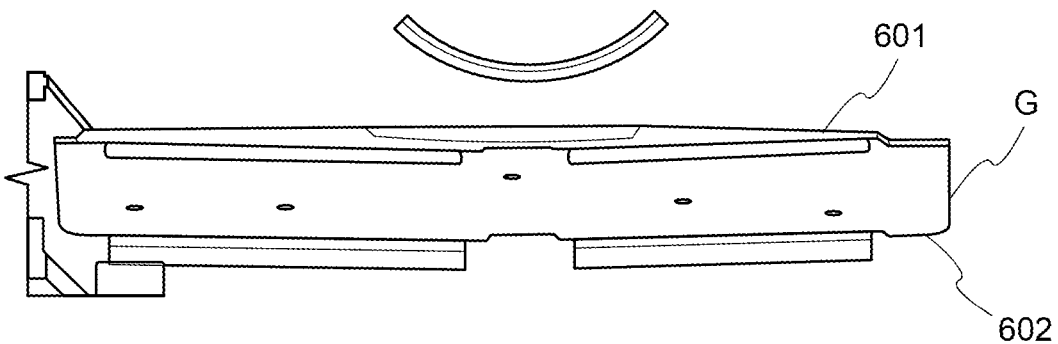
FIG. 5 is used to explain the behavior of a panel such as shown in FIG. 4 due to heat.

As mentioned above, in the harsh braking conditions experienced by e.g. wheels on an aircraft landing gear, high temperatures are reached and pieces of hot material can break off from the rotor discs. Thus, in use, the wheel assembly becomes hot and the purpose of the heat shield is to manage the heat generated in the wheel assembly. Accordingly, the heat shield materials also experience high temperatures. The temperature at the inner surface of the heat shield is higher than that at the outer surface which means that the inner layer 601 of the panels will become hotter than the outer layer 602. Consequently, the inner layer will undergo greater thermal expansion than the outer layer. Because, as mentioned above, these layers are fixed relative to each other at the seams, the greater deformation of the inner layer relative to the outer layer causes the heat shield panel 60 to deform as can be seen in FIG. 5 where the inner layer 601 becomes arched or buckles. This can cause the heat shield to be damaged and/or to contact the wall of the tube well 1 by being deflected into the insulation gap between the heat shield and the tube well interior surface. Because the retainer is made of relatively thin, light material, deformation of the panels can cause the retainer to deflect outwards and contact the wheel rim and this can result in damage and wheel abrasion. Also, if the retainers are not sufficiently strong to retain the heat shield panels in such conditions, the heat shield panels themselves can also contact the wheel. This can cause wheel abrasion and/or heat shield damage/abrasion and require the entire wheel assembly to be replaced.

The aim of the present disclosure is to provide a heat shield panel design having multiple layers, which allows for the different thermal expansion of the layers, whilst they are still connected at their edges, without resulting in deformation of the panel/inner layer.

Figures 6, 7:
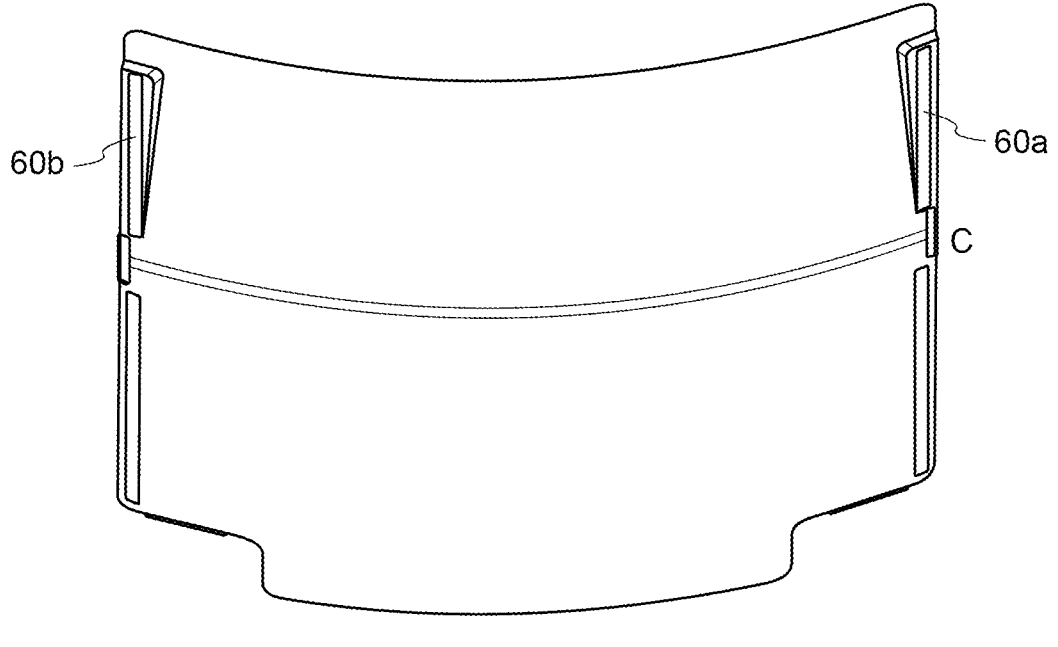
FIG. 6 shows an example of a heat shield panel according to this disclosure.
FIG. 7 is a sectional view of a heat shield panel according to this disclosure.

This is achieved by forming the inner layer 601 of the heat shield panel as a segmented layer, as seen in FIG. 7—i.e. being formed of two or more layer segments 601a, 601b with a separation or break 601c therebetween, such that the layer segments are able to move relative to each other in the area of the separation although they are still connected at the panel edges to the outer layer(s).

An example of a heat shield panel with such a segmented inner layer can be seen in FIG. 7.

Figure 8:
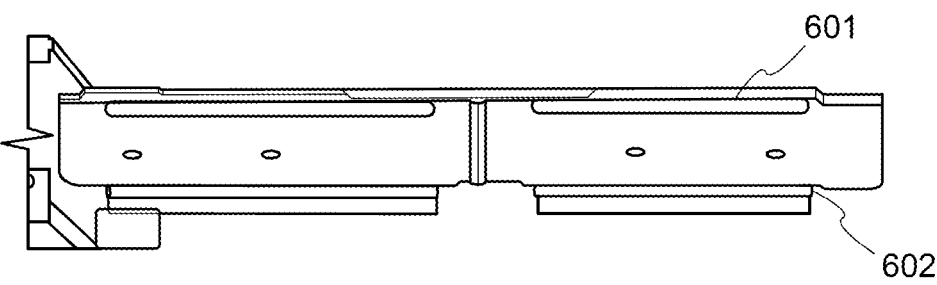
FIG. 8 is used to explain the behavior of a panel such as shown in FIG. 7 due to heat.

As can be seen, the inner layer 601 is formed as two layer segments that are separated at their inner edges 611a, 611b. In the example shown, the inner edges are at the ends of respective inner portions which, in the default state of the heat shield, overlap. The outer edges 621a, 621b of the layer segments substantially align with the outer edges of the other layer(s) 602, 603 of the panel to define the edges 60a, 60b, shown in FIG. 6, of the panel. By forming the inner layer of two or more layer segments, each layer segment can expand, due to the effects of heat, separately (in the example shown, increasing or reducing the degree of overlap at the inner ends 611a, 611b) thus reducing the deformation of the inner layer. The result can be seen in FIG. 8 where the panel stays relatively flat even when subjected to high temperatures.

Figure 9A:
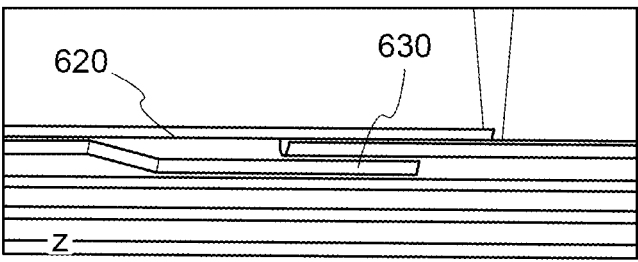
FIGS. 9A and 9B show some alternative examples of a heat shield panel according to the disclosure.
Figure 9B:
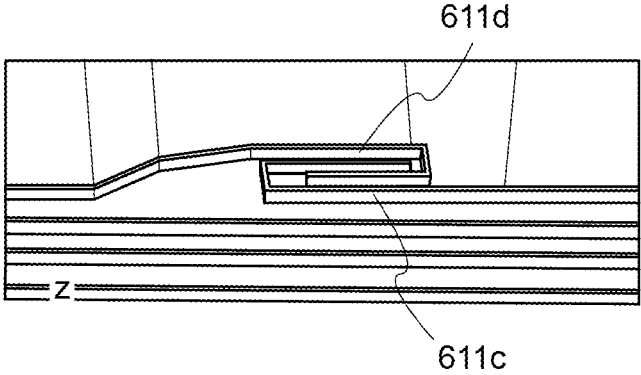

The panel can be formed with the inner layer segments having their inner edges free and not connected, and the tension under which the heat shield is mounted in the wheel assembly has been found to be sufficient to keep the inner layer such that its inner edges overlap without the need for any physical retaining means. In other examples, though, it may be desirable to provide some form of attachment or barrier at the inner edges which still allows relative movement of the edges and, thus, the segments, but present a barrier to any dust e.g. carbon dust from the brake components, or other contamination, passing through the break. Carbon dust can, for example, increase the heat conductivity of the heat shields which can then result in even higher temperatures at the wheel. Some examples of such attachment are shown in FIGS. 9A and 9B. In the example in FIG. 9A, an additional plate 620 may be attached e.g. by a spot weld 630 to one of the segments and extend across the other segment to press the segments, at their inner edges, closer together whilst still allowing them to slide relative to each other. In the example in FIG. 9B, the inner edges 611c, 611d may be formed to interlock e.g. with a C-shape or U-shape such that the gap between the layer segments is closed to contaminants but relative movement is still possible.

The examples show the inner layer having two layer segments, but this is just one example and the inner layer can be segmented into more than two layer segments.

The use of a segmented inner layer for a heat shield panel provides a simple and inexpensive way of preventing or reducing deformation of the panel at high temperatures. The segmented inner layer can be easily applied to existing heat shields.

What is claimed is:

1. A heat shield panel comprising a radially inner heat shield layer and a radially outer heat shield layer, the radially inner heat shield layer and the radially outer heat shield layer each having two circumferentially outer edges, wherein the circumferentially outer edges of the radially inner heat shield layer and the circumferentially outer edges of the radially outer heat shield layer are aligned and are affixed to each other to form heat shield panel edges, wherein the radially inner heat shield layer is formed of two or more segments each having a circumferentially inner edge, and wherein the circumferentially inner edges overlap one another, the circumferentially inner edges of the segments being arranged to move relative to each other.

2. The heat shield panel of claim 1, further comprising one or more radially intermediate heat shield layers arranged between the inner heat shield layer and the outer heat shield layer, the one or more intermediate heat shield layers having two outer edges aligned with and affixed to the outer edges of the inner heat shield layer and the outer heat shield layer.

3. The heat shield panel of claim 1, wherein the circumferential inner edge of each of the two or more segments of the inner heat shield layer comprise at least one of an attachment or barrier configured to prevent dust from passing between the inner edges of the respective segments.

4. The heat shield panel of claim 3, wherein the means for preventing dust passing between the inner edges of the respective segments comprises a plate affixed to one of the segments.

5. The heat shield panel of claim 4, wherein the plate is affixed to one of the segments by a spot weld.

6. The heat shield panel of claim 3, wherein the means for preventing dust passing between the inner edges of the respective segments comprises an interlocking feature provided at each of the inner edges.

7. The heat shield panel of claim 6, wherein the interlocking feature comprises a C-shaped interlock at the inner edge.

8. A heat shield assembly for a wheel assembly, comprising a plurality of arcuate heat shield panels arranged to be connected together to form a heat shield to be attached to the interior of a wheel, each heat shield panel being the heat shield panel as claimed in claim 1.

9. The heat shield assembly as claimed in claim 8, wherein one or more connectors is provided between each pair of adjacent panels.

10. The heat shield assembly of claim 9, wherein the one or more connectors secure the inner and outer layers together at the outer edges.

11. A wheel assembly comprising a wheel rim having a radially inner surface and a radially outer surface, and the heat shield assembly as claimed in claim 8, attached to and having a radially outer surface radially spaced from the radially inner surface of the wheel rim.

12. The wheel assembly of claim 11, further comprising a plurality of torque bars arranged around the radially inner surface of the heat shield, a torque bar positioned along a central elongate panel of each retainer.

13. The wheel assembly of claim 11 being a wheel assembly for a landing gear of an aircraft.

* * * * *